United States Patent
Konjeti et al.

(10) Patent No.: US 9,704,509 B2
(45) Date of Patent: Jul. 11, 2017

(54) ACTIVE NOISE CANCELLATION APPARATUS AND METHOD FOR IMPROVING VOICE RECOGNITION PERFORMANCE

(71) Applicant: Harman International Industries, Inc., Stamford, CT (US)

(72) Inventors: Srikanth Konjeti, Karnataka (IN); Vallabha Vasant Hampiholi, Karnataka (IN)

(73) Assignee: Harman International Industries, Inc., Stamford, CT (US)

( * ) Notice: Subject to any disclaimer, the term of this patent is extended or adjusted under 35 U.S.C. 154(b) by 0 days.

(21) Appl. No.: 14/812,300

(22) Filed: Jul. 29, 2015

(65) Prior Publication Data
US 2017/0032806 A1    Feb. 2, 2017

(51) Int. Cl.
    G10K 11/16    (2006.01)
    G10L 25/84    (2013.01)
    (Continued)

(52) U.S. Cl.
    CPC .......... *G10L 25/84* (2013.01); *G10K 11/1784* (2013.01); *G10K 11/1786* (2013.01);
    (Continued)

(58) Field of Classification Search
    CPC ..... G10K 2210/128; G10K 2210/1281; G10K 2210/1282; G10K 2210/1283; G10K 2210/1184
    (Continued)

(56) References Cited

U.S. PATENT DOCUMENTS 5,033,082 A   7/1991  Eriksson et al.
5,245,664 A   9/1993  Kinoshite et al.
(Continued)

FOREIGN PATENT DOCUMENTS

EP    1583075 A1    10/2005
JP    2009107438 A   5/2009
WO    2008029336 A1   3/2008

OTHER PUBLICATIONS

Farina, "Advancements in impulse response measurements by sine sweeps", Audio Engineering Society, Convention Paper, 122nd Convention, May 5-8, 2007, Vienna, Austria, 21 pages.
(Continued)

*Primary Examiner* — Disler Paul
(74) *Attorney, Agent, or Firm* — Brooks Kushman P.C.

(57) ABSTRACT

In at least one embodiment, a vehicle active noise cancellation (ANC) apparatus including an ANC controller is disclosed. The ANC controller is operably coupled to at least one error microphone. The ANC controller is configured to receive a first signal indicative of environmental noise that propagates through a vehicle cabin and that is received at a voice recognition (VR) microphone and to generate a noise cancellation wave to remove the environmental noise, the noise cancellation wave being received at the VR microphone. The ANC controller is configured to receive an audio output from the at least one error microphone that is at least indicative of the environmental noise and the noise cancellation wave received at the VR microphone and to apply at least one correction filter to the audio output to remove the environmental noise and the noise cancellation wave that is received at the VR microphone.

20 Claims, 6 Drawing Sheets

(51) Int. Cl.
*G10K 11/178* (2006.01)
*G10L 15/20* (2006.01)
*G10L 21/02* (2013.01)
*H04R 3/00* (2006.01)
*G10L 21/0216* (2013.01)

(52) U.S. Cl.
CPC .............. *G10L 15/20* (2013.01); *G10L 21/02* (2013.01); *H04R 3/005* (2013.01); *G10K 2210/1082* (2013.01); *G10K 2210/1282* (2013.01); *G10K 2210/3028* (2013.01); *G10K 2210/3044* (2013.01); *G10K 2210/3225* (2013.01); *G10L 2021/02165* (2013.01); *H04R 2410/05* (2013.01)

(58) Field of Classification Search
USPC ...................................... 391/71.1, 71.4, 71.11
See application file for complete search history.

(56) References Cited

U.S. PATENT DOCUMENTS

| | | |
|---|---|---|
| 2004/0086135 A1 | 5/2004 | Vaishya |
| 2008/0188271 A1 | 8/2008 | Miyauchi |
| 2011/0206214 A1* | 8/2011 | Christoph .......... G10K 11/1784 381/71.6 |
| 2011/0305347 A1* | 12/2011 | Wurm .................. G10K 11/178 381/71.1 |
| 2012/0259629 A1 | 10/2012 | Akino |
| 2013/0163774 A1 | 6/2013 | Maeda |
| 2015/0362988 A1* | 12/2015 | Yamamoto ............. G06F 3/011 345/156 |
| 2016/0035341 A1* | 2/2016 | Warkentin .......... G10K 11/178 381/71.4 |

OTHER PUBLICATIONS

Extended European Search Report for Application No. 16181423.1, dated Dec. 22, 2016, 12 pages.

* cited by examiner

ACTIVE NOISE CANCELLATION APPARATUS AND METHOD FOR IMPROVING VOICE RECOGNITION PERFORMANCE

TECHNICAL FIELD

Aspects of the present disclosure provide an active noise cancellation (ANC) apparatus in a system and a method for improving voice recognition performance in a vehicle or other suitable environment.

BACKGROUND

A growing number of vehicles are equipped with a voice recognition (VR) system for receiving an audio input from a driver. The voice recognition system generally enables a hassle-free and hands-free operation of certain features of the vehicle to minimize driver distraction. The VR system includes a VR microphone which is installed in the vehicle and is positioned proximate to the driver to receive the voice input. In most cases, the microphone is positioned near a rear view mirror of the vehicle.

The VR system generally comes with a variety of challenges. For example, the VR system may be susceptible to environmental noise (i.e., engine/road noise, etc.). Such environmental noise may affect the quality of the voice input when provided to the microphone of the VR system. This condition negatively impacts the voice input which may lead the VR system to incorrectly recognize the voice input and lead to false positives.

An interior of the vehicle is generally noisy and this can be attributed to the vehicle cabin acting as an acoustic cavity thereby increasing the intensity of the noise that propagates from the engine and the road via chassis interaction or any other environmental noise. Various active noise cancellation (ANC) implementations which include error microphones have been used to reduce the environmental noise in vehicle cabins. Such implementations may reduce the noise at spots directly under a particular error microphone but not globally within the cabin. Speakers in the vehicle may produce a secondary noise field to cancel out primary noise in and around the error microphone. However, the error microphone may not be positioned near the VR microphone and this condition enables noise to propagate to the VR microphone.

SUMMARY

In at least one embodiment, a vehicle active noise cancellation (ANC) apparatus including an ANC controller is disclosed. The ANC controller is operably coupled to at least one error microphone. The ANC controller is configured to receive a first signal indicative of environmental noise that propagates through a vehicle cabin and that is received at a voice recognition (VR) microphone and to generate a noise cancellation wave to remove the environmental noise, the noise cancellation wave being received at the VR microphone. The ANC controller is configured to receive an audio output from the at least one error microphone that is at least indicative of the environmental noise and the noise cancellation wave received at the VR microphone and to apply at least one correction filter to the audio output to remove the environmental noise and the noise cancellation wave that is received at the VR microphone.

In at least one embodiment, a method for performing active noise cancellation (ANC) in a vehicle is disclosed. The method includes receiving a first signal indicative of environmental noise that propagates through a vehicle cabin at a voice recognition (VR) microphone and generating a noise cancellation wave to remove the environmental noise. The method further includes receiving the noise cancellation wave at the VR microphone and receiving an audio output from at least one error microphone positioned in the vehicle that is at least indicative of the environmental noise and the noise cancellation wave received at the VR microphone. The method includes applying at least one correction filter to the audio output to remove the environmental noise and the noise cancellation wave that is received at the VR microphone.

In at least one embodiment, a vehicle active noise cancellation (ANC) apparatus including an ANC controller is disclosed. The ANC controller includes a virtual voice recognition (VR) error microphone generated in a tuning phase. The ANC controller is operably coupled to at least one error microphone. The ANC controller is configured to receive a first signal indicative of environmental noise that propagates through an enclosure and that is received at a physical VR microphone and to generate a noise cancellation wave to remove the environmental noise, the noise cancellation wave being received at the VR microphone. The ANC controller is further configured to receive an audio output from the at least one error microphone that is at least indicative of the environmental noise and the noise cancellation wave received at the VR microphone and to apply at least one correction filter to the audio output to remove the environmental noise and the noise cancellation wave that is received at the VR microphone.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits, electrical devices, and at least one controller. All references to the circuits, the at least one controller, and other electrical devices and the functionality provided by each, are not intended to be limited to encompassing only what is illustrated and described herein. While particular labels may be assigned to the various circuit(s), controller(s) and other electrical devices disclosed, such labels are not intended to limit the scope of operation for the various circuit(s), controller(s) and other electrical devices. Such circuit(s), controller(s) and other electrical devices may be combined with each other and/or separated in any manner based on the particular type of electrical implementation that is desired.

It is recognized that any controller as disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any controller as disclosed utilizes any one or more microprocessors to execute a computer-program that is embodied in a non-transitory computer readable medium that is programmed to perform any number of the functions as disclosed. Further, any controller as provided herein includes a housing and the various number of microprocessors, integrated circuits, and memory devices ((e.g., FLASH, random access memory (RAM), read only memory (ROM), electrically programmable read only memory (EPROM), electrically erasable programmable read only memory (EEPROM)) positioned within the housing. The controller(s) as disclosed also include hardware based inputs and outputs for receiving and transmitting data, respectively from and to other hardware based devices as discussed herein.

Aspects disclosed herein may reduce noise in and around a microphone used in connection with voice recognition operation that may not add cost to the voice recognition (VR) system while at the same time the use of an active noise cancellation (ANC) may not hamper performance for the VR system. An error microphone used in connection with an ANC system may be positioned near a VR microphone that is used in connection with the VR system. For example, the VR microphone may receive voice input from a vehicle occupant for purposes of the VR system performing an operation based on the voice input. By positioning the error microphone near the VR microphone, an estimate of the noise encountered at the VR microphone (or at this position) relative to other error microphones situated in the vehicle may be obtained. Positioning the error microphone near the VR microphone may be performed in a tuning phase. Any number of correction filters may be generated during the tuning phase to minimize the estimated noise captured by the error microphone near the VR microphone. The number of correction filters is generally directly proportional to the number of error microphones in the ANC system. In other words, the various correction filters may be configured to minimize the error encountered between the error microphone positioned near the VR microphone and the other error microphones positioned elsewhere in the vehicle to reduce environmental noise. If, for example, there are four error microphones for four different seating positions, then a correction filter is generated for each error microphone relative to the VR microphone.

In general, each correction filter represents a prediction parameter. With the prediction parameter, the noise pattern that is present at the position of the VR microphone in relation to the noise captured at other error microphones used in the ANC system may be estimated or predicted. It is also recognized that after the tuning phase, the error microphone that was placed near the VR microphone may be removed from the vehicle when the vehicle is in a production phase. This aspect may reduce cost as an existing error microphone positioned in a desired area (e.g., in a seating position for an occupant) that is generally used in connection with the ANC system may be used in the tuning phase and then subsequently used for its intended purpose for a production (or live) phase thereby still enabling adequate noise cancellation at the position of the VR microphone.

Figure 1:
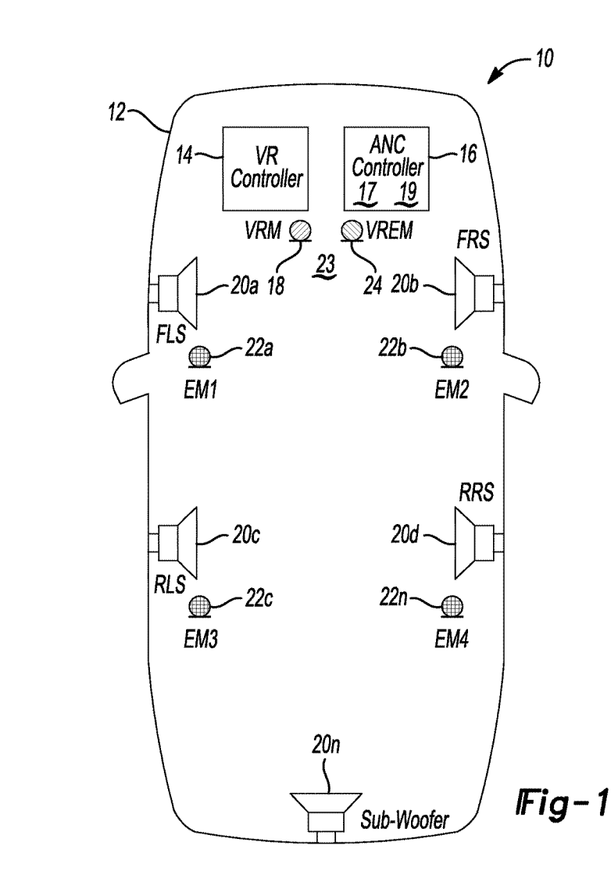
FIG. 1 depicts an active noise cancellation (ANC) system in a tuning phase in accordance to one embodiment.

FIG. 1 depicts an active noise cancellation (ANC) system 10 in a tuning phase in a vehicle 12 in accordance to one embodiment. The system 10 includes a voice recognition (VR) controller 14 and at least one active noise cancellation (ANC) controller 16 (hereafter "the ANC controller 16"). The ANC controller 16 includes at least one microprocessor 17 and memory 19. A VR microphone 18 is electrically coupled to the VR controller 14 and optionally to the ANC controller 16. A vehicle occupant may provide a voice input to the VR microphone 18. In turn, the VR microphone 18 provides an electrical output indicative of the voice input to the VR controller 14. The VR controller 14 processes the electrical output and controls other electrical devices in the vehicle 12 to perform a desired task as indicated in the voice input. Example voice inputs that may be used include, but not limited to, commands to (i) adjust a volume of a radio/multi-media device, (ii) adjust a temperature setting in a vehicle, (iii) interface with a cell phone for enabling hands free operation of the cell phone, etc.

A plurality of speakers 20a-20n ("20") is positioned in an interior cabin of the vehicle 12 (or enclosure for non-vehicle applications). The speakers 20 may be part of an in-vehicle entertainment system (not shown) to play back audio data. In addition, the VR controller 14 is configured to output voice based audio to the vehicle occupant(s). While only five speakers 20 are illustrated it is recognized that any number of speakers may be implemented. The system 10 further includes a plurality of error microphones 22a-22n that is used in connection with performing ANC. In general, a respective error microphone 22 is positioned proximate to an area in which a vehicle occupant may be seated. The ANC system 10 is configured to remove environmental noise such as but not limited to engine and road noise in the vehicle 12 for the vehicle occupants in the vehicle 12. The ANC controller 16 may transmit a secondary noise field from a corresponding speaker 20 to cancel out the environmental noise in the vehicle 12.

During a tuning phase, an error microphone 22 may be positioned proximate to, or at the same position (or location) 23 of the VR microphone 18. In this case, the error microphone 22 that is positioned proximate to, or at the same position of the VR microphone during the tuning phase may be generally defined as a VR error microphone (or VREM) 24. Further, in the tuning phase, the vehicle 12 is driven at any number of predetermined rotations per minute (RPM) (or different vehicle speeds) on any number of roads to estimate the environmental noise that is present at the location 23 of the VR microphone 18. As noted above, the environmental noise may include, but not limited to, engine or road noise. Additionally, a secondary path response that includes a noise cancellation wave is provided from each speaker 20 to cancel the environmental noise that is present at the VR microphone 18. The ANC controller 16 stores a corresponding correction filter between the location 23 of the VR microphone 18 and each error microphone 22 to estimate the environmental noise or other noise that may propagate to, or be present at the location 23 of the VR microphone 18 given the actual noise that is captured by each error microphone 22.

While in the tuning phase, the ANC controller 16 also estimates the environmental noise that is present at the location for each of the error microphones 22 to perform ANC under the normal practice for an ANC system. A computing device, such as for example, a laptop or other suitable device (not shown) is electrically coupled to the ANC controller 16 during the tuning phase where bi-directional communication occurs. The computing device generates a corresponding correction filter for each error microphone 22 positioned throughout the vehicle 12 including the error microphone 22 (or the VREM 24) that is positioned proximate to the VR microphone 18. During the tuning phase, the computing device generates each correction filter based on the environmental noise that is received for each error microphone 22. The computing device electronically transmits (e.g., wirelessly or hardwire) the correction filters to the ANC controller 16 for storage on the memory 19. In a production phase, the ANC controller 16 may then use the corresponding filter to cancel the environmental noise and the noise cancellation wave at the proper amplitude, frequency, phase, etc., to cancel the environmental noise and the noise cancellation wave that is received at the VR microphone 18. This aspect will be discussed in more detail below.

Figure 2:
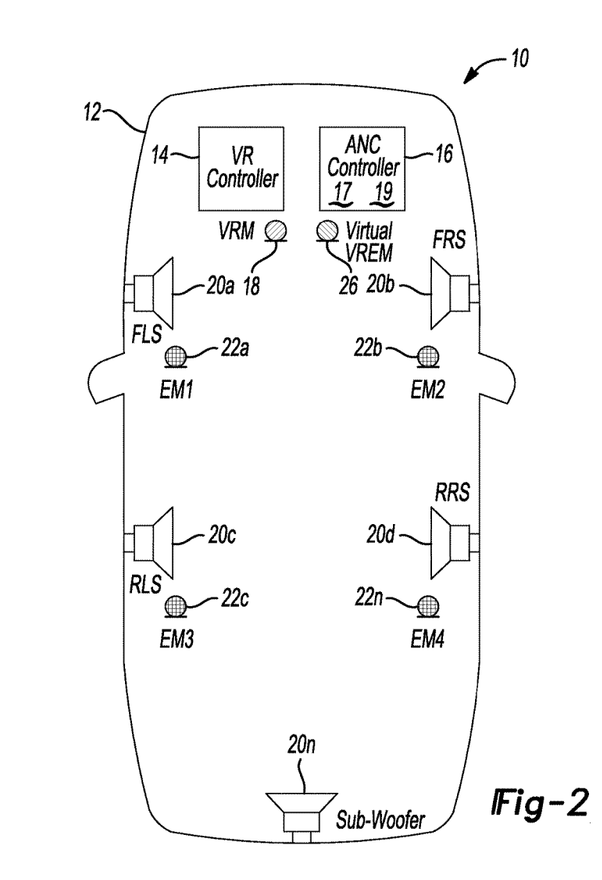
FIG. 2 depicts the ANC system in a production phase in accordance to one embodiment.

FIG. 2 depicts the ANC system 10 in the production phase in accordance to one embodiment. In the production phase, the ANC controller 16 receives information corresponding to a virtual VR error microphone 26 from the computing device during the tuning phase. The memory 19 stores the information corresponding to the virtual VR error microphone 26. The virtual VR error microphone 26 represents the location 23 of VR microphone 18 in relation to the VRM 24 as used in connection with the tuning phase of FIG. 1. The ANC controller 16 may utilize (or apply) the correction filters as generated during the tuning phase to estimate the noise at the virtual VR error microphone 26 while monitoring the environmental noise captured at the other error microphones 22a-22n while the vehicle 12 is being driven.

Figure 3:
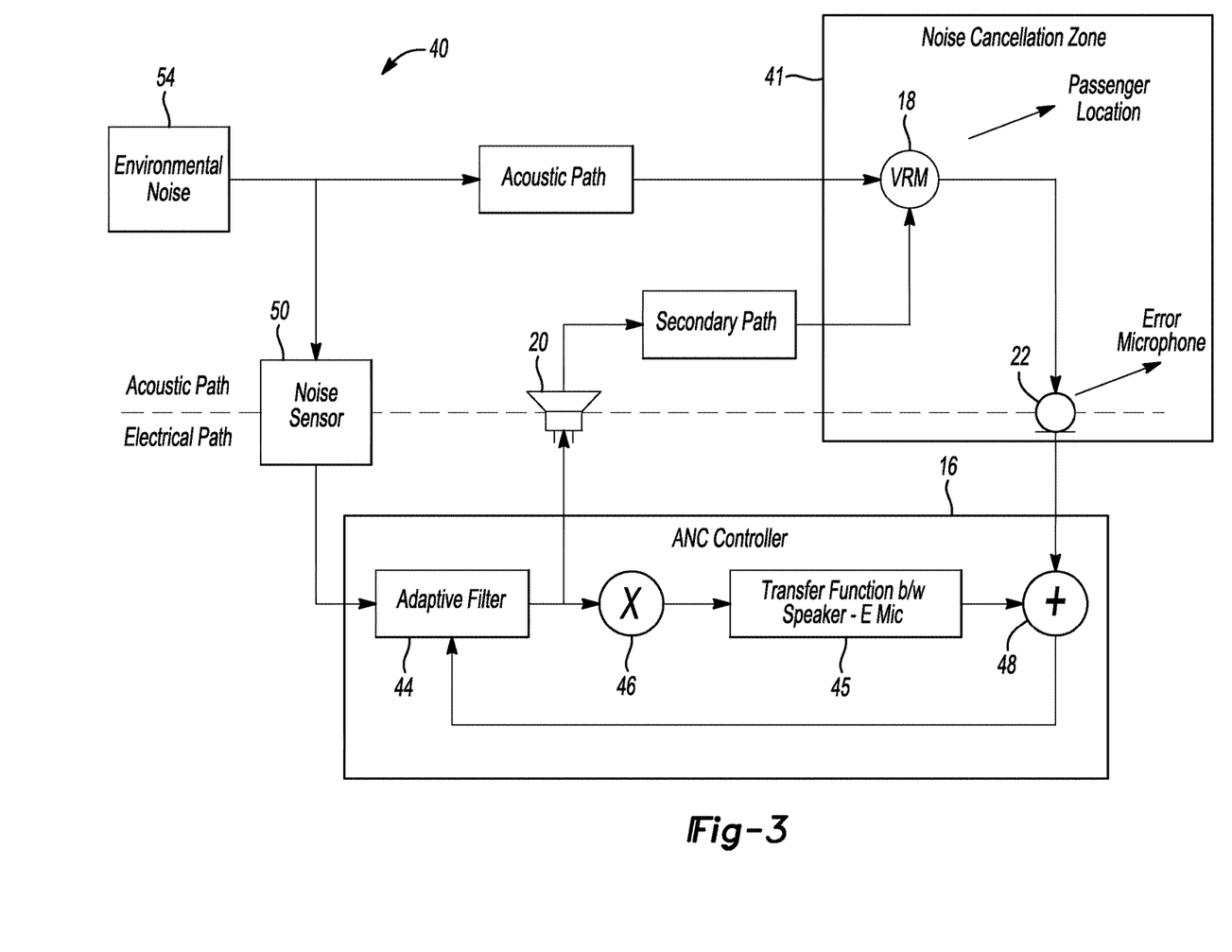
FIG. 3 depicts an acoustic path and an electrical path for an example ANC system.

FIG. 3 depicts an example ANC system 40 that differs from the implementations illustrated in connection with FIGS. 1 and 2. The system 40 includes the error microphone 22 that may be positioned in a general vicinity of the VR microphone 18 that is used in connection with a voice recognition system. The VR microphone 18 and the error microphone 22 are positioned in a passenger location of the vehicle 12 but may not be necessarily positioned proximate to one another. The error microphone 22 and the VR microphone 18 may be located in a noise cancellation zone 41. The system 40 includes the ANC controller 16 including an adaptive filter 44, a gain circuit 46, and an adder circuit 48. The ANC controller 16 electrically stores information corresponding to the transfer function 45. This will be discussed below. The system 40 further includes a noise sensor 50, and the at least one speaker 20 positioned in the vehicle 12 that is used for ANC purposes. As noted above, environmental noise 54 may be in an acoustic path of the VR microphone 18. In other words, the VR microphone 18 may pick up undesired or unwanted environmental noise 54 that propagates through a vehicle cabin that may degrade the overall quality of the VR system.

The noise sensor 50 (in the ANC system) may be a tachometer or an accelerometer. The noise sensor 50 (i.e., tachometer) may provide engine RPM that corresponds to engine noise that propagates through the vehicle cabin. Additionally, the noise sensor 50 (i.e., accelerometer) may provide vehicle speed information that corresponds to road noise that propagates through the vehicle cabin. In general, the noise sensor 50 (in the ANC system 40) picks up the environmental noise 54 to characterize the amount of relative noise that propagated in the cabin of the vehicle 12. The adaptive filter 44 reduces the environmental noise 54 by generating a noise cancellation wave at the speaker 20 that is out of phase with respect to the environmental noise 54. As noted above, in general, the ANC system 40 may reduce noise at spots near the error microphone 22 but not globally within the vehicle 12. Therefore, the VR microphone 18 may not only have to deal with a primary noise field such as the environmental noise 54 but noise generated by the ANC system 40 (i.e., the noise cancellation field) that is provided on a secondary path. The ANC controller 16, during a tuning phase may perform various impulse response measurements as set forth in, for example, "Advancement In Impulse Response Measurements By Sine Sweeps," by Angelo Farnia, University of Parma, Ind. Eng. Dept., Parco Area delle Scienze 181/a, 43100 Parma, Italy, May 2007, which is hereby incorporated by reference in its entirety. Such an impulse response measurement (or sin sweep signal) is arranged to characterize the noise introduced by the secondary path with respect to each error microphone 22.

The ANC controller 16 stores a transfer function 45 (or frequency response) which characterizes the noise (e.g., the environmental noise 54 and the noise cancellation wave) that is received at the error microphone 22. It should be recognized that this is performed for each error microphone 22 positioned near each corresponding speaker 20 in the vehicle but not near or proximate to the VR microphone 18 as in this example. Thus, the ANC controller 16 adds the output from the error microphone 22 to an output via the transfer function 45, via the adder circuit 48, to cancel out the noise (e.g., the environmental noise 54 and the noise cancellation wave) present at the output of the error microphone 22. However, as shown, the transfer function 45 does not address the environmental noise 54 and/or the noise cancellation wave that is received at the VR microphone 18.

Figure 4:
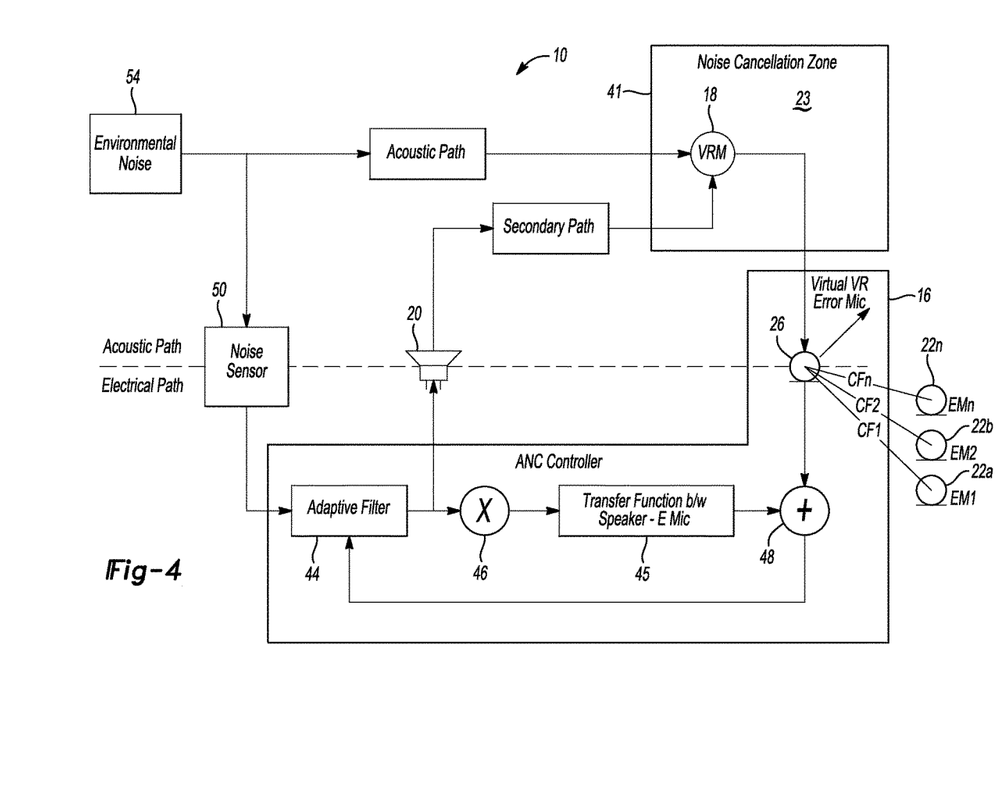
FIG. 4 depicts an acoustic path and an electrical path for the ANC system in accordance to one embodiment.

FIG. 4 depicts the ANC system 10 in accordance to one embodiment which generally corresponds to the implementations illustrated in FIGS. 1 and 2. Specifically, FIG. 4 depicts the acoustic path and the electrical path for the ANC system 10. Further, FIG. 4 depicts the condition in which the ANC system 10 has undergone the tuning phase as noted in connection with FIG. 1 in which the correction filters (e.g., CF1, CF2, CFn, etc.) and the virtual VR error microphone 26 have been generated. The ANC controller 16 includes the adaptive filter 44, the gain circuit 46, the adder circuit 48, and the transfer function 45 as previously shown in connection with FIG. 3.

As noted, the ANC controller 16 generates a corresponding correction filter between each error microphone 22 in the system 10 in relation to the VR microphone 18 in the noise cancellation zone 41. Thus, in this regard, the ANC controller 16 characterizes the undesired sound on the acoustic path (e.g., the environmental noise 54) and on the secondary path (e.g., the noise cancellation wave) during the tuning phase and generates the correction filters to mitigate or reduce the impact of the undesired sound received at the VR microphone 18 with respect to each error microphone 20. While FIG. 4 depicts that the error microphones 22a-22n are positioned on a lower right hand side of the ANC controller 16, this is provided only to illustrate that a corresponding corrective filter CF1, CF2 and CFn is applied to an output of a corresponding error microphone 22a, 22b, and 22n, respectively. The virtual VR error microphone 26 corresponds to the simulated version of the actual physical error microphone 22 (or VREM 24) in relation to the VR microphone 18 which is illustrated in FIG. 1.

The noise sensor 50 (in the ANC system 10) picks up the environmental noise 54 to characterize the amount of relative noise that propagated in the cabin of the vehicle 12. The adaptive filter 44 reduces the environmental noise 54 by generating a noise cancellation wave at the speaker 20 that is out of phase with respect to the environmental noise 54. As noted above, the VR microphone 18 may not only have to deal with a primary noise field such as the environmental noise 54 but noise generated by the ANC system 40 that is provided on a secondary path where both the environmental noise 54 and the noise cancellation wave (e.g., via the secondary path) are picked up at the VR microphone 18 in the noise cancellation zone 41.

The ANC controller 16 applies the corresponding correction filters CF1, CF2, and CFn based on the actual noise captured at the corresponding error microphones 22a-22n in relation to the virtual VR error microphone 26 (again, which is an electronically simulated version of an actual physical error microphone 22 positioned proximate or at the same location 23 of the VR microphone 18 during the tuning phase) to the output of the VR microphone 18 to cancel out the environmental noise 54 and the noise cancellation wave as received at the VR microphone 18 via the secondary path. This can be accomplished without the need to package an additional error microphone 22 near the VR microphone 18 during the production phase.

Figure 5A:
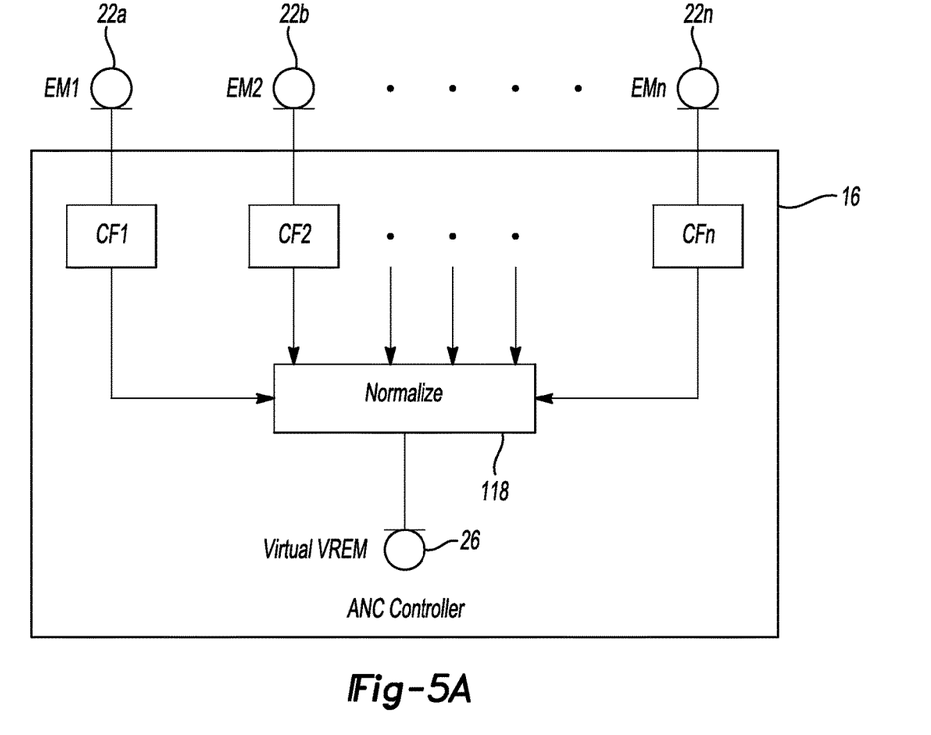
FIG. 5A-5B depicts various correction filters as generated by the ANC system in the tuning phase in accordance to one embodiment.
Figure 5B:
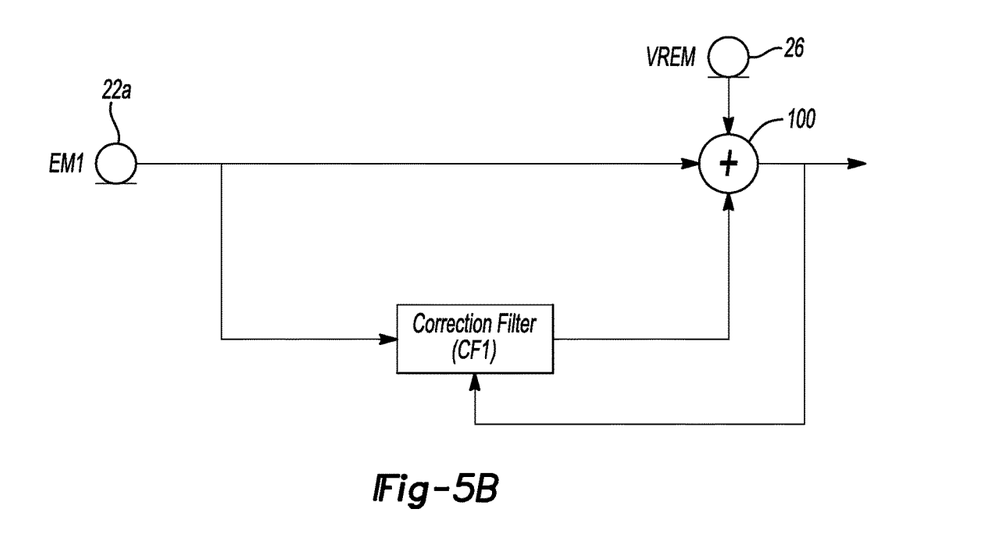

FIG. 5A-5B depicts various correction filters (e.g., CF1, CF2, . . . , CFn) as generated by the ANC system 10 in the tuning phase in accordance to one embodiment. As noted above, the ANC controller 16 generates each correction filter for a corresponding error microphone 22 of the VR microphone 18 during the tuning phase. In the production or live mode, the ANC controller 16 generates the virtual VR error microphone 26 to correspond to the VR microphone 18 at the location 23 in the vehicle 12 with respect to the error microphone 22 (or VREM 24) also positioned at the location 23 in the vehicle 12 as illustrated in connection with FIG. 1. As further noted, the ANC controller 16 estimates the secondary path between the speaker 20 and the corresponding error microphone 22 that is positioned proximate thereto in reference to the VR microphone 18 at the location 23 in the vehicle 12.

The ANC controller 16 then generates the corresponding correction filter to characterize the noise at the VR microphone 18 at the location 23 in the vehicle 12 and the corresponding error microphone 22 in the vehicle 12 in the tuning phase. Consider the correction filter generated in connection with the error microphone 22a as an example. Thus, to arrive at the correction filter (e.g., CF1) for the noise present between the error microphone 22a and the VR microphone 18 as shown in FIG. 5A, the vehicle 12 is driven around at various speeds such that the ANC controller 16 generates and adapts the correction filter (e.g., CF1) to provide a relationship between the error microphone 22a and the VR microphone 18 (i.e., the virtual VR error microphone 26 in the production phase) for various noise scenarios. Similarly, a noise relationship between the error microphone 22b and the VREM 24 is established to provide the correction filter (e.g., CF2) and so on for each error microphone 22 in the vehicle 12.

In the production phase, the error microphone 22 is positioned proximate to the VREM 24 (or at the location 23 in the vehicle 12) is removed and the ANC controller 16 generates and stores the virtual VR error microphone 26 to be indicative of the actual error microphone 22 positioned at the location 23 of the VR microphone 18 in the vehicle 12 during the tuning phase.

The correction filters represent or characterize the actual noise between the virtual VR error microphone 26 and each corresponding error microphone 22. The correction filters are also used to mitigate or remove the environmental noise and the noise cancellation field that is picked up at the VR microphone 18. In connection to FIG. 5A, the ANC controller 16 includes a normalize circuit 118 to normalize the filter input as received from each error microphone 22a-22n. For example, the normalize circuit 118 ensures that the each filtered input after receipt from the error microphone(s) 22 have generally the same amplitude and frequency.

In reference to FIG. 5B, for illustrative purposes, assume that during the tuning phase, the environmental noise and the noise cancellation field (e.g., via the secondary path) is received at the error microphone 22a at an amplitude of 0.5 and that the environmental noise and the noise cancellation field (e.g., via the secondary path) is received at the VR microphone 18 at an amplitude of 0.25, the correction filter (CF1) is generated to apply a gain of 1.5 to the amplitude of the of environmental noise 54 and the noise cancellation field via the secondary path (e.g., 0.5) so that the correction filter CF1 outputs a gain of 0.75. Adder circuit 48 adds the amplitude of the environmental noise 54 and the noise cancellation field as received at the error microphone 22a and the amplitude of the environmental noise 54 and the noise cancellation field as received at the VR microphone 18 (e.g., a total amplitude of 0.75, or approximately 0.75) and subtracts the same from the amplitude of the output of the correction filter CF1 (e.g., a total amplitude of 0.75, or approximately 0.75) to cancel the amplitude of environmental noise 54 and noise cancellation field at each of the error microphone 22a and the VR microphone 18 so that the output of the adder circuit 48 is zero or some value that is close to zero. During the tuning phase, the gain of the corrective filter may be stored in an estimator block (not shown) and recalled in the production phase when similar amplitudes are detected at the error microphone 22a and at the VR microphone 18. It is recognized that the parameters utilized by any of the correction filters may include, but not limited to, amplitude, frequency, phase, etc.

Figure 6:
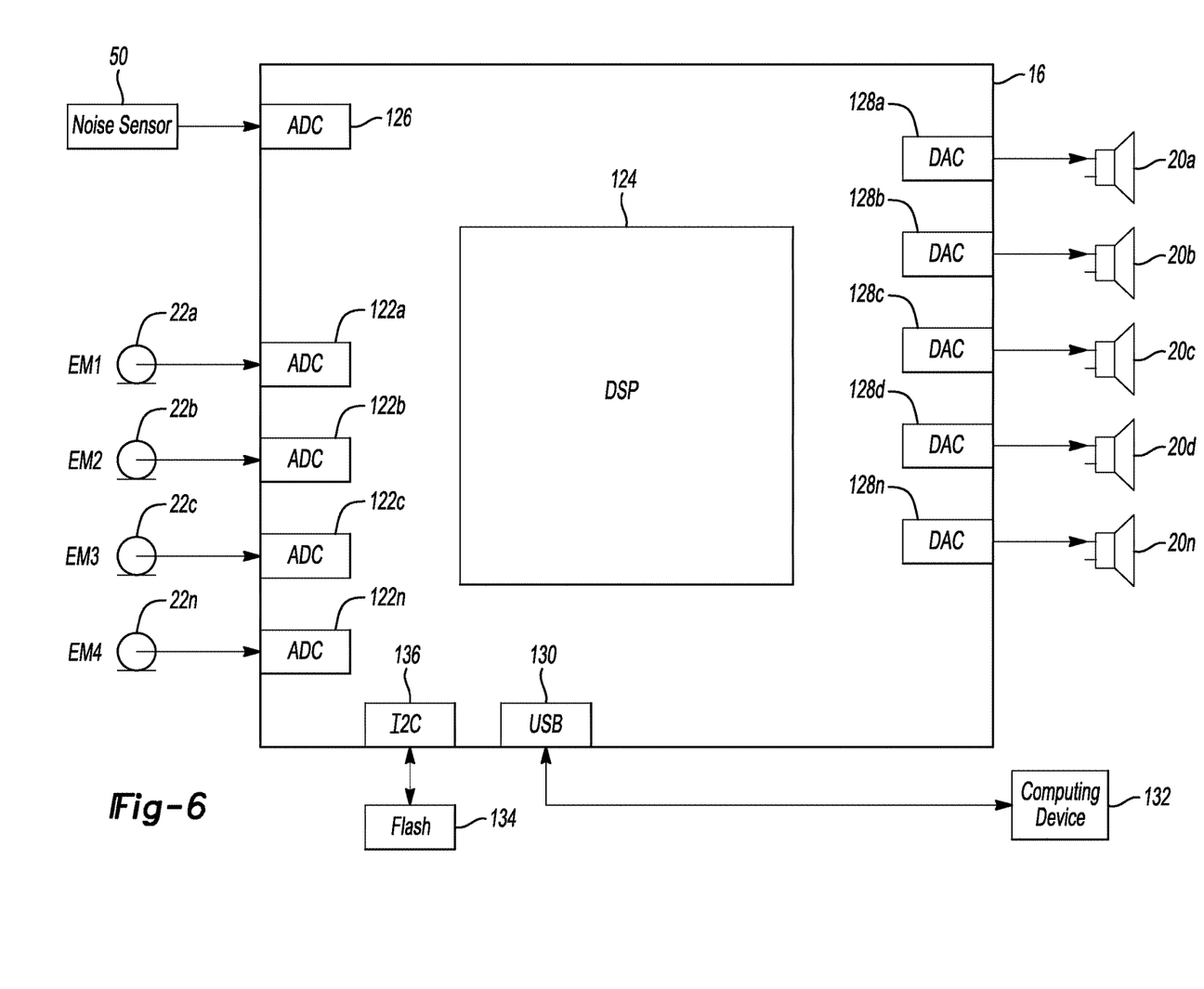
FIG. 6 depicts an ANC controller as utilized in connection with the ANC system in accordance to one embodiment.

FIG. 6 depicts a more detailed view of the ANC controller 16 as utilized in connection with the ANC system 10 in accordance to one embodiment. The ANC controller 16 includes a plurality of first analog to digital converters (ADC) 122a-122n ("122") that receive an audio input in an analog format from corresponding error microphones 22a-22n. The audio input may comprise sound picked up from within the interior section of the vehicle 12 such as the environmental noise 54 and the noise cancellation field via the secondary path. The ANC controller 16 converts the analog format of the audio input into a digital format. A digital signal processor (DSP) (or other processor) 124 receives the digitized audio inputs from the various ADCs 122. The ANC controller 16 further includes a second analog to digital converter (ADC) 126 that receives an audio input indicative of the environmental noise 54 in an analog format from the noise sensor 50. The ADC 126 converts the audio input into a digital format and provides the same to the DSP 124.

The DSP 124 processes the digitized audio inputs from the noise sensor 50 and the error microphones 22 to provide active noise cancellation in the vehicle 12 and to cancel the environmental noise 54 and the noise cancellation field as received at the VR microphone 18. The DSP 124 may include any number for filters to perform the active noise cancellation in the vehicle 12. A plurality of digital to analog converters (DACs) 128a-128n ("128") are provided to convert the processed/filter audio output from the DSP 124 into an analog output to provide to the speakers 20a-20n in the vehicle 12.

A USB port (or other suitable port) 130 is provided such the DSP 124 is configured to bi-directionally communicate with a computing device 132 (e.g., laptop, etc). The computing device 132 may be used during the tuning phase in order to characterize the environmental noise 54 and the noise cancellation field at the VR microphone 18 in reference to each error microphone 22. The computing device 132 may generate the various correction filters and information corresponding to the virtual VR error microphone 26 as noted above and provide the same to the DSP via the USB port 130. Alternatively, an I2C port 136 may receive a flash memory 134 with information corresponding to the correction filters.

Figure 7:
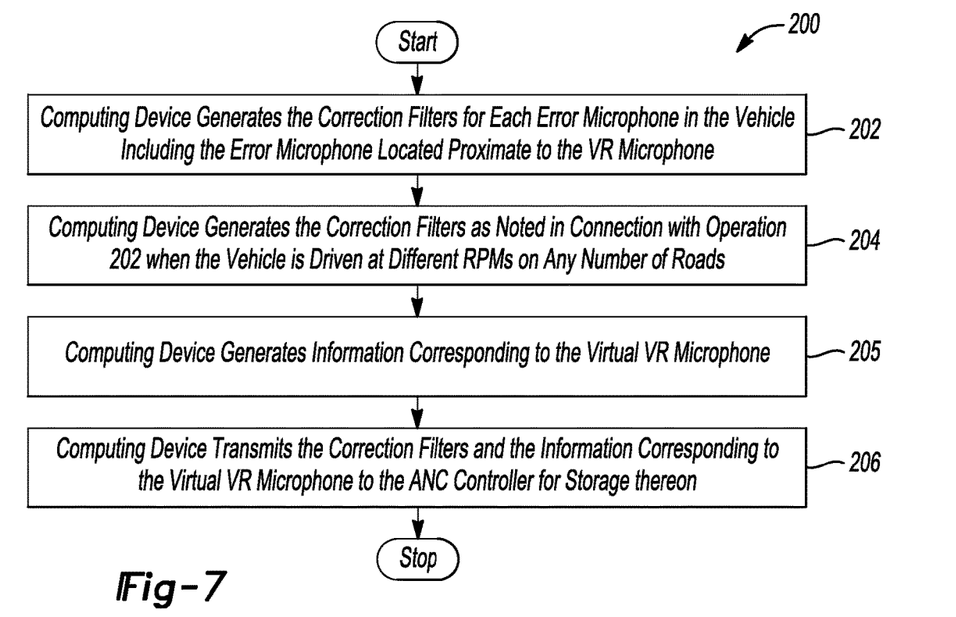
FIG. 7 depicts a method for generating correction filters in accordance to one embodiment.

FIG. 7 depicts a method 200 for generating correction filters during the tuning phase in accordance to one embodiment In operation 202, the computing device 132 generates the correction filters for each error microphone 22 in the vehicle 12 including the error microphone 22 located proximate to the VR microphone 18.

In operation 204, the computing device 132 generates the correction filters as noted in connection with operation 202 when the vehicle 12 is driven at different RPMs on any number of roads.

In operation 205, the computing device 132 generates information corresponding to the virtual VR error microphone 26.

In operation 206, the computing device 132 transmits the correction filters and the information corresponding to the virtual VR error microphone 26 to the ANC controller 16 for storage thereon.

Figure 8:
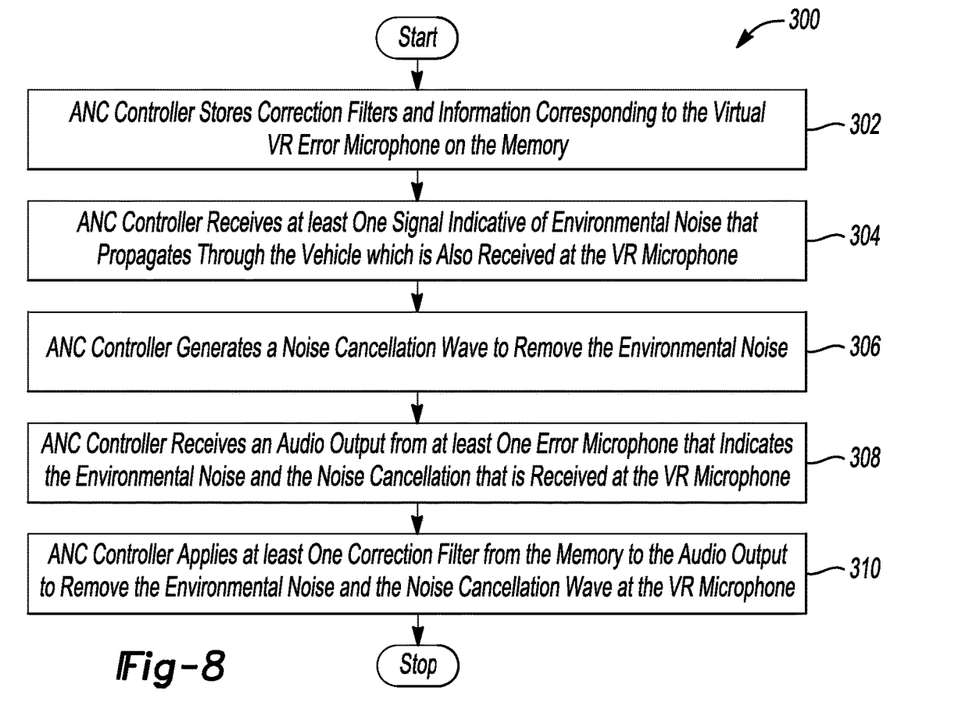
FIG. 8 depicts a method for performing ANC in the vehicle in accordance to one embodiment.

FIG. 8 depicts a method 300 for performing ANC in the vehicle 12 in accordance to one embodiment.

In operation 302, the ANC controller 16 stores correction filters and information corresponding to the virtual VR error microphone 26 on the memory 19.

In operation 304, the ANC controller 16 receives at least one signal indicative of environmental noise that propagates through the vehicle 12 which is also received at the VR microphone 18.

In operation 306, the ANC controller 16 generates a noise cancellation wave to remove the environmental noise.

In operation 308, the ANC controller 16 receives an audio output from at least one error microphone 22 that indicates the environmental noise and the noise cancellation that is received at the VR microphone 18.

In operation 310, the ANC controller 16 applies at least one correction filter from the memory 19 to the audio output to remove the environmental noise and the noise cancellation wave at the VR microphone 18.

While the aspects disclosed herein describe the use of an active noise cancellation system that is used in connection with a microphone that receives audio input from a driver in a vehicle, it is recognized that the disclosed active noise cancellation system may be used in an application that employs active noise cancellation in the presence of a microphone. In one example, the aspects disclosed herein may be used in connection with headphone that includes a microphone and error microphones used in connection with active noise cancellation. Any type of noise that is desired to be removed can be characterized in a corresponding a tuning phase and correction filters can be generated in the manner as disclosed above to compensate for unwanted noise that is picked up at the microphone.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle active noise cancellation (ANC) apparatus comprising:
    an ANC controller including memory for being operably coupled to at least one error microphone, the ANC controller being configured to:
        receive a first signal indicative of environmental noise that propagates through a vehicle cabin and that is received at a voice recognition (VR) microphone;
        generate a noise cancellation wave to remove the environmental noise, the noise cancellation wave being received at the VR microphone;
        receive an audio output from the at least one error microphone that is at least indicative of the environmental noise and the noise cancellation wave received at the VR microphone; and
        apply at least one correction filter from the memory to the audio output to remove the environmental noise and the noise cancellation wave that is received at the VR microphone; and
        generate a virtual error microphone when the at least one error microphone is positioned proximate to the VR microphone.

2. The vehicle ANC apparatus of claim 1 wherein the ANC controller is further configured to generate the virtual error microphone during a tuning phase to characterize the environmental noise and the noise cancellation wave that is present at the VR microphone when the at least one error microphone is placed at a location proximate to the VR microphone.

3. The vehicle ANC apparatus of claim 2 wherein the tuning phase corresponds to a vehicle being driven at a plurality of different speeds and on a plurality of roads.

4. The vehicle ANC apparatus of claim 1 wherein the ANC controller is further configured to store information corresponding to the virtual error microphone in the memory.

5. The vehicle ANC apparatus of claim 1 wherein the ANC controller includes a normalize circuit configured to apply at least one of an amplitude and frequency to each output of the at least one correction filter.

6. The vehicle ANC apparatus of claim 1 wherein the ANC controller includes an adder circuit to receive an output from the at least one correction filter and to receive an output from a transfer function.

7. The vehicle ANC apparatus of claim 6 wherein the adder circuit is configured to remove the environmental noise and the noise cancellation wave that is received at the VR microphone based on the adder circuit adding the output from the at least one correction filter and the output from the transfer function.

8. A method for performing active noise cancellation (ANC) in a vehicle, the method comprising:
receiving a first signal indicative of environmental noise that propagates through a vehicle cabin at a voice recognition (VR) microphone;
generating a noise cancellation wave to remove the environmental noise,
receiving the noise cancellation wave at the VR microphone;
receiving an audio output from at least one error microphone positioned in the vehicle that is at least indicative of the environmental noise and the noise cancellation wave received at the VR microphone; and
applying at least one correction filter to the audio output to remove the environmental noise and the noise cancellation wave that is received at the VR microphone; and
electronically generating a virtual VR error microphone when the at least one error microphone is positioned proximate to the at least one error microphone.

9. The method of claim 8 wherein electronically generating the virtual VR error microphone further includes electrically generating the virtual VR error microphone during a tuning phase to characterize the environmental noise and the noise cancellation wave that is present at the VR microphone when the at least one error microphone is placed at a location proximate to the VR microphone.

10. The method of claim 9 wherein the tuning phase corresponds to a vehicle being driven at a plurality of different speeds and on a plurality of roads.

11. The method of claim 8 further comprising storing information corresponding to the virtual VR error microphone in electronic memory after electronically generating the virtual VR error microphone.

12. The method of claim 8 further comprising normalizing each output of the at least one correction filter by applying at least one of an amplitude and a frequency to each output of the at least one correction filter.

13. The method of claim 8 further comprising receiving an output from the at least one correction filter and an output from a transfer function.

14. The method of claim 13 further comprising adding the output from the at least one correction filter and to the output from the transfer function to remove the environmental noise and the noise cancellation wave that is received at the VR microphone.

15. An active noise cancellation (ANC) apparatus comprising:
a memory; and
an ANC controller including a virtual voice recognition (VR) error microphone that is stored on the memory, the ANC controller for being operably coupled to at least one error microphone, the ANC controller being configured to:
receive a first signal indicative of environmental noise that propagates through an enclosure and that is received at a VR microphone;
generate a noise cancellation wave to remove the environmental noise, the noise cancellation wave being received at the VR microphone;
receive an audio output from the at least one error microphone that is at least indicative of the environmental noise and the noise cancellation wave received at the VR microphone;
apply at least one correction filter from the memory to the audio output to remove the environmental noise and the noise cancellation wave that is received at the VR microphone; and
generate the virtual VR error microphone when the at least one error microphone is positioned proximate to the VR microphone.

16. The ANC apparatus of claim 15 wherein the ANC controller is further configured to generate the virtual VR error microphone during a tuning phase to characterize the environmental noise and the noise cancellation wave that is present at the VR microphone when the at least one error microphone is placed at a location proximate to the VR microphone.

17. The ANC apparatus of claim 16 wherein the tuning phase corresponds to a vehicle being driven at a plurality of different speeds and on a plurality of roads.

18. The ANC apparatus of claim 15 wherein the ANC controller includes a normalize circuit configured to apply at least one of an amplitude and frequency to each output of the at least one correction filter.

19. The ANC apparatus of claim 15 wherein the ANC controller includes an adder circuit to receive an output from the at least one correction filter and to receive an output from a transfer function.

20. The ANC apparatus of claim 19 wherein the adder circuit is configured to remove the environmental noise and the noise cancellation wave that is received at the VR microphone based on the adder circuit adding the output from the at least one correction filter and the output from the transfer function.

* * * * *